United States Patent
Nguyen

(10) Patent No.: US 9,840,902 B2
(45) Date of Patent: Dec. 12, 2017

(54) MAGNETIC PROPPANT PARTICULATES FOR USE IN SUBTERRANEAN FORMATION OPERATIONS

(71) Applicant: Halliburton Energy Services, Inc., Houston, TX (US)

(72) Inventor: Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 226 days.

(21) Appl. No.: 14/538,005

(22) Filed: Nov. 11, 2014

(65) Prior Publication Data

US 2016/0130499 A1 May 12, 2016

(51) Int. Cl.
E21B 43/267 (2006.01)
E21B 33/068 (2006.01)
C09K 8/80 (2006.01)
C09K 8/40 (2006.01)

(52) U.S. Cl.
CPC .............. *E21B 43/267* (2013.01); *C09K 8/40* (2013.01); *C09K 8/805* (2013.01); *E21B 33/068* (2013.01)

(58) Field of Classification Search
CPC ...................................... C09K 8/40
See application file for complete search history.

(56) References Cited

U.S. PATENT DOCUMENTS

| | | | |
|---|---|---|---|
| 6,116,342 A | 9/2000 | Clark et al. | |
| 6,439,309 B1 | 8/2002 | Matherly et al. | |
| 2005/0274510 A1* | 12/2005 | Nguyen | C09K 8/805 166/250.12 |
| 2008/0283243 A1* | 11/2008 | Rediger | E21B 43/267 166/276 |
| 2011/0114313 A1* | 5/2011 | Lesko | C09K 8/665 166/280.1 |
| 2012/0067577 A1* | 3/2012 | Roddy | C04B 40/0641 166/292 |
| 2012/0181020 A1 | 7/2012 | Barron et al. | |
| 2014/0145716 A1 | 5/2014 | Dirksen et al. | |
| 2014/0290943 A1* | 10/2014 | Ladva | E21B 43/267 166/280.1 |
| 2014/0345863 A1* | 11/2014 | Ladva | C09K 8/805 166/280.1 |

* cited by examiner

*Primary Examiner* — Anuradha Ahuja
(74) *Attorney, Agent, or Firm* — McDermott Will & Emery LLP

(57) ABSTRACT

Preparing a treatment fluid comprising a base fluid and magnetic proppant particulates, wherein the magnetic proppant particulates comprise proppant particulates at least partially coated with a stabilization agent and magnetic particles, and preparing a spacer fluid comprising a base fluid, a gelling agent, and a breaker. Introducing the treatment fluid and the spacer fluid intermittently into a subterranean formation comprising a fracture so as to alternate placement of the magnetic proppant particulates in the treatment fluid with the spacer fluid in the fracture, and activating the magnetic particles, wherein the activated magnetic particles cause the magnetic proppant particulates to agglomerate. Propping open the fracture with the magnetic proppant particulates, and activating the breaker in the spacer fluid so as to at least partially remove the spacer fluid from the fracture, thereby leaving behind substantially magnetic proppant particulate-free channels between the magnetic proppant particulates.

15 Claims, 1 Drawing Sheet

MAGNETIC PROPPANT PARTICULATES FOR USE IN SUBTERRANEAN FORMATION OPERATIONS

BACKGROUND

The embodiments herein relate generally to subterranean formation operations and, more particularly, to magnetic proppant particulates.

Subterranean wells (such as hydrocarbon producing wells, water producing wells, and the like) are often stimulated by hydraulic fracturing treatments. In hydraulic fracturing treatments, a treatment fluid is pumped into a portion of a subterranean formation at a rate and pressure such that the subterranean formation breaks down and one or more fractures are formed. Typically, particulate solids are then deposited in the fractures. These particulate solids, or "proppant particulates" or "proppant," serve to prevent the fractures from fully closing once the hydraulic pressure is removed by forming a proppant pack. As used herein, the term "proppant pack" refers to a collection of proppant particulates in a fracture. By keeping the fracture from fully closing, the proppant particulates aid in forming conductive paths through which fluids may flow.

The degree of success of a fracturing operation depends, at least in part, upon fracture porosity and conductivity once the fracturing operation is stopped and production is begun. Traditional fracturing operations place a large volume of proppant particulates into a fracture and the porosity of the resultant packed propped fracture is then related to the interconnected interstitial spaces between the abutting proppant particulates. Thus, the resultant fracture porosity from a traditional fracturing operation is closely related to the strength of the placed proppant particulates (if the placed proppant crushes, then the pieces of broken proppant may plug the interstitial spaces) and the size and shape of the placed proppant (larger, more spherical proppant particulates generally yield increased interstitial spaces between the particulates).

Unfortunately, when fractures close upon the proppant particulates they can crush or become compacted, potentially forming non-permeable or low permeability masses within the fracture rather than desirable high permeability masses. Such low permeability masses may choke the flow path of the fluids within the formation. Furthermore, the proppant particulates may become embedded in particularly soft formations, negatively impacting production.

One way to increase conductivity of proppant packs involves the placement of proppant aggregates comprised of multiple individual proppant particulates. The larger size of the proppant aggregates allows a reduced volume of proppant to be placed into the fracture while maintaining the structural integrity required to keep the fracture from closing and crushing the proppant aggregates. Additionally, the spaces between the proppant aggregates through which produced fluids flow may be larger than the interstitial spaces that would be present between individual proppant particulates. Typical proppant aggregates are formed by agglomerating proppant particulates using a resin or tackifying agent that may, or may not, remain tacky after the aggregates have formed. This method relies on the proppant particulates colliding in a treatment fluid downhole during an operation and may in some instances lead to inefficient agglomeration or smaller formed aggregates than desirable.

Another method proposed to combat problems inherent in tight spaces is to pump a substantially solids free fluid intermittently between pumping proppant particulates and/or proppant aggregates. The solids free fluid forms spaces within the proppant pack by preventing individual proppant particulates and/or proppant aggregates from gathering particularly close to one another. These spaces, or "proppant free channels," form conductive channels through which produced fluids may flow. However, such intermittent pumping may be deleterious to operational equipment, as it requires the constant turning on and off of the equipment. Additionally, the intermittent pumping may cause additives in either the solids free fluid or other treatment fluids to settle out during the constant pressure changes (i.e., as the pumping equipment is stopped and begun again) and/or deposition of the additives in undesired locations in the subterranean formation.

BRIEF DESCRIPTION OF THE DRAWINGS

The following FIGURE is included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
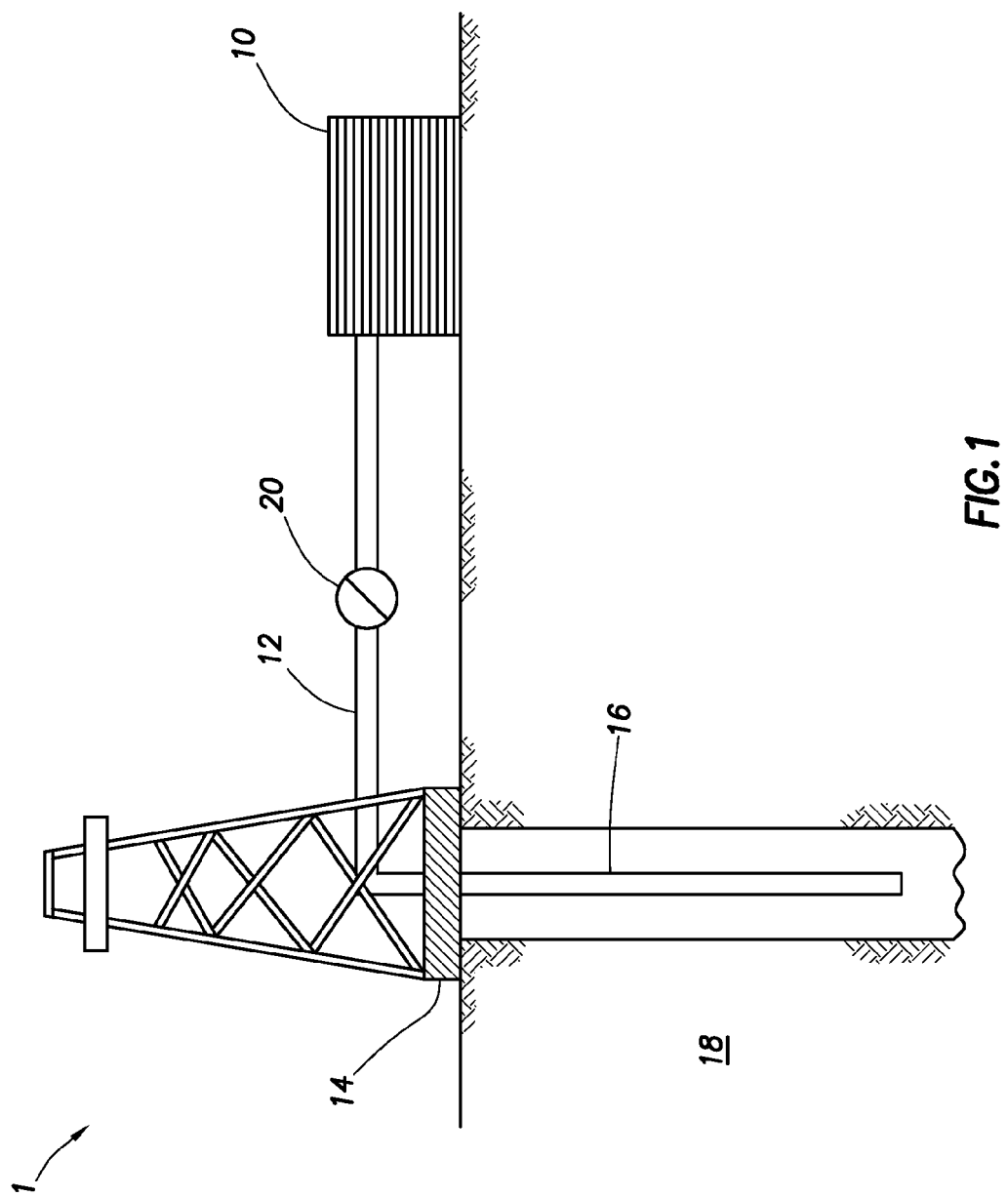
FIG. 1 depicts an embodiment of a system configured for delivering various fluids of the embodiments described herein to a downhole location.

The embodiments herein relate generally to subterranean formation operations and, more particularly, to magnetic proppant particulates. Specifically, the magnetic proppant particulates of the present disclosure comprise proppant particulates coated with a stabilization agent and magnetic particles, wherein either or both of the stabilization agent and the magnetic particles function to agglomerate the magnetic proppant particulates together to form aggregates. Consolidated aggregates may further be formed by curing the stabilization agent such that the consolidated aggregates represent a solidified mass of individual magnetic proppant particulates that do not substantially become dispersed without application of shear. Moreover, the attraction of the magnetic particles coated onto the proppant particulates themselves may result in an aggregate that does not substantially disperse into individual magnetic proppant particulates without the application of shear. As used herein, the term "substantially" means largely, but not necessarily wholly.

One advantage of the magnetic proppant particulates of the present disclosure may include reliable formation of aggregates by agglomeration of the magnetic proppant particulates suspended in a treatment fluid for use in a fracture at various stages of a fracturing operation including after the magnetic proppant particulates enter a fracture through an opening (e.g., a perforation). The time at which the magnetic attraction between individual magnetic proppant particulates occurs may be fine-tuned for particular operations by controlling magnetic activation of the magnetic particles coated thereon. Another advantage may include enhanced adhesion points between magnetic proppant grains to allow the stabilization agent to cure and form strong bonds to form consolidated aggregates. That is, rather than relying on the stabilization agent coated on the proppant particulates alone to agglomerate the individual proppant particulates, the magnetic particles coated thereon also aid in agglomeration. Additionally, intermittent injection of treatment fluids comprising the magnetic coated proppant particulates disclosed herein may ensure that large masses are not formed and channels are achieved in a fracture that allow enhanced produced fluid flow therethrough.

In some embodiments, the methods and compositions described herein may be with reference to a hydraulic fracturing operation (e.g., formation of a proppant pack). However, the magnetic proppant particulates may be used in any other subterranean formation operation that may benefit their agglomeration properties. Such subterranean formation operations may include, but are not limited to, a stimulation operation; an acid-fracturing operation; a sand control operation; a fracturing operation; a frac-packing operation; a remedial operation; and any combination thereof.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, the present disclosure provides magnetic proppant particulates comprising proppant particulates at least partially coated with a stabilization agent and magnetic particles.

In some embodiments, the present disclosure provides magnetic proppant particulates comprising proppant particulates at least partially coated with a stabilization agent and magnetic particles. The proppant particulates may be wholly or substantially (wherein "substantially" refers to "largely but not necessarily wholly") coated with the stabilization agent and magnetic particles, or may be only partly coated therewith.

The magnetic proppant particulates disclosed herein comprise magnetic particles may be configured such that they are dispersed within a network of the stabilization agent coating (e.g., a mixture of the stabilization agent and the magnetic particles are simultaneously coated onto the proppant particulates), positioned such that they assemble as a coating on the surface of the stabilization agent coating (i.e., a first at least partial coating of the stabilization agent followed by a second at least partial coating of the magnetic particles thereon), or a combination thereof. In most instances, either one of the two configurations will be employed, although a combination is possible and may arise naturally where some magnetic particles are dispersed within the stabilization agent and others are positioned atop the stabilization agent coating (e.g., as another layer). Moreover, use of a combination of magnetic proppant particulates having both configurations may be used in a particular subterranean formation, without departing from the scope of the present disclosure.

The order of coating of the stabilization agent and the magnetic particles is not limiting and any order of coating may be used without departing from the scope of the present disclosure. Generally, however, the stabilization agent must either first be coated onto the proppant particulates or be mixed with the magnetic particles prior to coating the proppant particulates to ensure that the magnetic particles are adhered or otherwise properly coated onto the proppant particulates (e.g., the stabilization agent acts as a "glue" to maintain the magnetic particles coated onto the proppant particulates).

The magnetic particles coated atop and/or dispersed within the stabilization agent coated onto proppant particulates may be any magnetizable material (e.g., metal) capable of use in a subterranean formation and which attracts other magnetic particles. Any combination of these magnetizable metals may be used as the magnetic particles for forming the magnetic proppant particulates of the present disclosure provided that they can be magnetized to have attractive forces amongst themselves to aid in agglomerating the magnetic proppant particulates into aggregates. The order in which the magnetic particles are magnetized relative to coating them onto the proppant particulates or in time as a subterranean operation is performed, as discussed in more detail below, is not limiting and any moment in time during the formation or the use of the magnetic proppant particulates may be selected for magnetization, without departing from the scope of the present disclosure. For example, the magnetic particles may be magnetized before or after the coating process, before or after storage, before or after a subterranean formation operation, before or after forming a proppant pack, and the like. Multiple stages of magnetization may also be performed to ensure that adequate magnetization is achieved at any stage between pre-coating and completion of use of the magnetic proppant particulates, without departing from the scope of the present disclosure.

In some embodiments, such as where the magnetic particles are activated but agglomeration of the magnetic proppant particulates is not yet desirable, whether before or after introducing the magnetic proppant particulates into a subterranean formation, the magnetic proppant particulates may further be encapsulated in an encapsulating material, such as to delay the attractive forces from agglomerating the magnetic proppant particulates together. For example, an encapsulating material might be desirable during storage or transport (e.g., conveyance) of the magnetic proppant particulates. Moreover, the encapsulating material may encapsulate the magnetic proppant particulates prior to activating the magnetic particles coated thereon to prevent agglomeration and without interfering with later activation of the magnetic particles, even if the encapsulating material remains in place (i.e., surrounding the magnetic proppant particulates) during activation. The encapsulating material may also degrade or otherwise be removed from the magnetic proppant particulates in a slow fashion to permit slower and possibly more orderly agglomeration of the magnetic proppant particulates. Generally, the encapsulating material will encompass all or a portion, preferably a large portion (greater than about 50%) of the magnetic proppant particulates and will degrade over time upon exposure to a certain environment (e.g., temperature, time alone, salinity, pH, and the like). Suitable encapsulating materials may include, but are not limited to, polyvinyl alcohol, polylactic acid, ethylene propylene diene monomer rubber, polyvinylidene chloride, polyacrylamide, nylon, waxes, polyurethanes, cross-linked partially hydrolyzed acrylics, shellac, calcium sulfate, calcium chloride, cementitious materials, and any combination thereof.

Magnetization may be achieved by activation of the magnetic particles by processes including, but not limited to, direct magnetization, indirect magnetization, and any combination thereof. Direct magnetization may pass current directly through the magnetic particles either prior to or after being coated onto the proppant particulates to form the magnetic proppant particulates of the present disclosure. Indirect magnetization may use a strong magnetic field to stimulate a magnetic field within the magnetic particles, either before or after coating. In some embodiments, indirect magnetization may be preferred where the magnetic particles, either alone or after forming the magnetic proppant particulates, may be subjected to a strong magnetic field in bulk, for example during storage, conveyance, or at a particular location downhole (e.g., just prior to reaching a fracture, after placement in a fracture, and the like). For example, the magnetic field may be accomplished by a magnetic field generator placed in, or, or otherwise configured to expose the magnetic particles to a magnetic field, such as in a storage tank, during conveyance, or at a downhole location, and the like. In some embodiments, the magnetic field using an electricity and/or heat (e.g., Magnetic Seebeck effect).

In some instances, the amount of attraction may be controlled by selecting a certain type or combination of types of magnetic particles. For example, magnetite, iron, cobalt, nickel, and manganese may be particularly magnetizable to achieve greater bond strength (i.e., greater attractive forces). Suitable magnetic particles may include, but are not limited to, magnetite, iron, nickel, cobalt, manganese, ferrite, low carbon steel, an iron-steel alloy, an iron-cobalt alloy, an iron-silicon alloy, a nickel-iron alloy, and any combination thereof. As used herein, "low carbon steel" refers to steel having a carbon content of less than about 0.3% (e.g., between about 0.0001% to about 0.3%, or about 0.001% to about 0.12%, encompassing any value and subset therebetween).

In some embodiments, magnetite may be a preferred magnetic particle for use in forming the magnetic proppant particulates of the present disclosure. Magnetite is a naturally occurring iron oxide ferromagnetic mineral. It is the most magnetic of the naturally occurring minerals (termed "lodestone" when magnetized). Magnetite is inert (e.g., does not substantially affect pH, does not consume dissolved oxygen, does not rust, does not degrade with time or usage, and the like), readily available, and inexpensive. Moreover, the properties of magnetite, as well as other magnetizable metals discussed herein permits their reuse, such as by recirculating any magnetic proppant particulates that have not formed a proppant pack in a fracture for later use, without reducing their magnetic potential.

The magnetic particles of the present disclosure are typically in the form of a powder, or fine powder that may be coated atop or dispersed within the network of the stabilization agent coated onto the proppant particulates to form the magnetic proppant particulates herein. Generally, the magnetic particles are substantially spherical in nature, but may have any other shape without departing from the scope of the present disclosure. In some embodiments, the magnetic particles have an average particle size distribution ranging from a lower limit of about 10 nanometers ("nm"); 100 nm; 1000 nm; 2,000 nm; 4,000 nm; 6,000 nm; 8,000 nm; 10,000 nm; 12,000 nm; 14,000 nm; 16,000 nm; 18,000 nm; 20,000 nm; 22,000 nm; 24,000 nm; 26,000 nm; 28,000 nm; 30,000 nm; 32,000 nm; 34,000 nm; 36,000 nm; 38,000 nm; 40,000 nm; 42,000 nm; 44,000 nm; 46,000 nm; 48,000 nm; and 50,000 to an upper limit of about 100,000 nm; 98,000 nm; 96,000 nm; 94,000 nm; 92,000 nm; 90,000 nm; 88,000 nm; 86,000 nm; 84,000 nm; 82,000 nm; 80,000 nm; 78,000 nm; 76,000 nm; 74,000 nm; 72,000 nm; 70,000 nm; 68,000 nm; 66,000 nm; 64,000 nm; 62,000 nm; 60,000 nm; 58,000 nm; 56,000 nm; 54,000 nm; 52,000 nm; and 50,000 nm, encompassing any value and subset therebetween. In some embodiments, the average particle size distribution of the magnetic particles is in the range of about 200 nm to about 80,000 nm, or in the range of about 1,000 nm to about 50,000 nm.

The fine powder size of the magnetic particles for use in forming the magnetic proppant particulates of the present disclosure permits ease of coating either as a layer atop the stabilization agent or dispersed within a network of the stabilization agent. The size additionally beneficially is so fine that it is not abrasive and aids in reducing any abnormal wear on equipment used in subterranean formation operations such as, for example, pumps, mixers, valves, transport tubulars, and the like, by the magnetic proppant particulates.

The proppant particulates forming the magnetic proppant particulates of the present disclosure may be formed of any material capable of withstanding fracture closure pressures in a subterranean formation. In some embodiments, the proppant particulates may be a natural or man-made material such as, for example, silica, alumina, fumed carbon, carbon black, graphite, mica, titanium dioxide, meta-silicate, calcium silicate, kaolin, talc, zirconia, boron, fly ash, crushed walnut, and any combination thereof. The proppant particulates may additionally be of any size and shape combination suitable for the particular subterranean formation operation in which they are being used (e.g., a fracturing operation) and larger than the magnetic particles which are coated thereon as part of forming the magnetic proppant particulates described herein. Generally, where the chosen proppant particulate is substantially spherical, suitable proppant particulates may have an average particle size distribution in the range of from a lower limit of about 100 µm, 150 µm, 200 µm, 250 µm, 300 µm, 350 µm, 400 µm, 450 µm, 500 µm, 550 µm, 600 µm, 650 µm, 700 µm, and 750 µm to an upper limit of about 1200 µm, 1150 µm, 1100 µm, 1050 µm, 1000 µm, 950 µm, 900 µm, 850 µm, 800 µm, and 750 µm, encompassing any value and subset therebetween. In other embodiments, the average particle size distribution of the proppant particulates may be greater than about 1250 µm, 1300 µm, 1350 µm, 1400 µm, 1450 µm, 1500 µm, or even larger, encompassing any value and subset therebetween. In some embodiments of the present disclosure, the proppant particulates may have a size in the range of from about 2 to about 140 mesh, U.S. Sieve Series.

In some embodiments of the present disclosure, it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cubic-shaped, rectangular-shaped, rod-shaped, ellipse-shaped, cone-shaped, pyramid-shaped, cylinder-shaped, and any combination thereof. That is, in embodiments wherein the particulates are substantially non-spherical, the aspect ratio of the material may range such that the material is fibrous to such that it is cubic, octagonal, or any other configuration. Substantially non-spherical proppant particulates are generally sized such that the longest axis is from about 0.02 inches ("in"), 0.03 in, 0.04 in, 0.05 in, 0.06 in, 0.07 in, 0.08 in, 0.09 in, 0.1 in, 0.11 in, 0.12 in, 0.13 in, 0.14 in, and 0.15 in to an upper limit of about 0.3 in, 0.29 in, 0.28 in, 0.27 in, 0.26 in, 0.25 in, 0.24 in, 0.23 in, 0.22 in, 0.21 in, 0.2 in, 0.19 in, 0.18 in, 1.17 in, 0.16 in, and 0.15 in length, encompassing any value and subset therebetween. In other embodiments, the longest axis is from about 0.05 inches to about 0.2 inches in length. In one embodiment, the substantially non-spherical proppant particulates may be cylindrical and have an aspect ratio of about 1.5 to about 1, and about 0.08 inches in diameter and about 0.12 inches in length. In another embodiment, the substantially non-spherical proppant particulates may be cubic having sides of about 0.08 inches in length. The use of substantially non-spherical proppant particulates may be desirable in some embodiments because, among other things, they may provide a lower rate of settling when slurried into a treatment fluid, or may be better suited for placement in the preexisting and/or new fractures in a subterranean formation to form a proppant pack.

The magnetic proppant particulates comprise an at least partial coating of a stabilization agent. The stabilization agent may serve to agglomerate the magnetic proppant particulates together in combination with the magnetic particles also coated onto the proppant particulates and may cure to form consolidated magnetic proppant particulate aggregates. To control proppant flowback, or at least withstand the shear force resulting from production flow rates of produced fluids (e.g., hydrocarbons), the magnetic proppant particulates of the present disclosure may have a unconfined compressive crush strength (USC) in the range of a lower limit of about 5 psi, 10 psi, 15 psi, 20 psi, 25 psi, 30 psi, 35 psi, 40 psi, 45 psi, and 50 psi to an upper limit of about 100 psi, 95 psi, 90 psi, 85 psi, 80 psi, 75 psi, 70 psi, 65 psi, 60 psi, 55 psi, and 50 psi, encompassing any value and subset therebetween. In other embodiments, the USC may be preferably be greater than about 100 psi, 120 psi, 150 psi, 175 psi, 200 psi, 225 psi, 250 psi, 275 psi, 300 psi, or even higher, such as up to about 3000 psi.

Two different times may be applicable to forming the magnetic proppant particulates of the present disclosure, one being the time for the magnetic particles to attract individual proppant particulates together and the second being the time for the stabilization agent that is contacted between various magnetic proppant particulates to cure. The time in which the stabilization agent is fully cured is not limited, provided that it is not fully cured prior to the coating of the magnetic particles to form the magnetic proppant particulates. In preferred embodiments, the magnetic particles are first magnetized prior to curing the stabilization agent so as to ensure that the magnetic proppant particulates have agglomerated together into aggregates that can thereafter be consolidated into a stable mass by curing of the stabilization agent. The curing of the stabilization agent, however, may be after coating the magnetic particles, during storage, or at a time after introduction of the magnetic proppant particulates to a downhole location during a subterranean formation operation, without departing from the scope of the present disclosure.

Suitable stabilization agents may include, but are not limited to, a non-aqueous tackifying agent, an aqueous tackifying agent, a silyl-modified polyamide compound, a resin, a crosslinkable aqueous polymer composition, a polymerizable organic monomer composition, a zeta potential-modifying aggregating composition, a silicon-based resin, a binder, a stabilization agent emulsion, and any combination thereof. Such combinations may include, for example, use of a non-curable stabilization agent (e.g., one that does not cure into a solid, hardened mass) for anchoring the magnetic particles onto the proppant particulates, whereas a curable stabilization agent may be used to agglomerate the magnetic proppant particulates together and cure into a consolidated mass.

Stabilization agents may be coated on-the-fly by including the stabilization agent in the treatment fluid along with the magnetic particles, directly prior to pumping the treatment fluid into the formation. As used herein, the term "on-the-fly" refers to performing an operation during a subterranean treatment that does not require stopping normal operations. In other instances, the stabilization agents may at least partially coat the proppant particulates directly before including them into the treatment fluid to be pumped into the formation (i.e., pre-coated). When the stabilization agent is pre-coated at least partially onto the proppant particulates, the magnetic particles may be coated therein or thereon on-the-fly or prior to an operation by including the magnetic particles into a treatment fluid comprising the at least partially stabilization agent coated proppant particulates. In such instances, the magnetic particles may be preferably be inactivated (i.e., not magnetized) to ensure that the magnetic particles do not self-agglomerate prior to being coated onto or within the stabilization agent, although such inactivation is not required and activated magnetic particles may also be used without departing from the scope of the present disclosure. In other instances, the magnetic particles may be at least partially pre-coated onto or within the stabilization agent already at least partially coated on the proppant particulates.

Non-aqueous tackifying agents suitable for use in the embodiments disclosed herein may be used such that they cure to form a non-hardened coating, or may be combined with a multifunctional material capable of reacting with the non-aqueous tackifying compound to cure to form a hardened coating. As used herein, the term "cure" and grammatical variants thereof (e.g., "curing") refers to substantially non-flowable reaction product, such as through the process of cross-linking chemical reactions of the stabilization agent. A "hardened coating" as used herein means that the reaction of the non-aqueous tackifying agent with the multifunctional material will result in a substantially non-flowable reaction product that exhibits a higher compressive strength in a consolidated agglomerate than the non-aqueous tackifying agent alone. In this instance, the non-aqueous tackifying agent may function similarly to a curable resin.

For use in the embodiments described herein, the non-aqueous tackifying agents may comprise polyamides that are liquids or in solution at the temperature of the subterranean formation such that they are, by themselves, non-hardening when introduced into the subterranean formation. A particularly preferred product is a condensation reaction product comprised of a polyacid and a polyamine. The non-aqueous tackifying agents may further comprise amounts of dibasic acids containing some trimer and higher oligomers and also small amounts of monomer acids that are reacted with polyamines, without departing from the scope of the present disclosure. Other polyacids for use as the non-aqueous tackifying agents may include, but are not limited to, trimer acids, synthetic acids produced from fatty acids, maleic anhydride, acrylic acid, and the like, and combinations thereof. Additional compounds which may be used as non-aqueous tackifying agents include liquids and solutions of, for example, polyesters, polycarbonates, silyl-modified polyamide compounds, polycarbamates, urethanes, natural resins such as shellac, and the like. Combinations of these may be suitable as well.

Multifunctional materials suitable for use in the present disclosure may include, but are not limited to, an aldehyde (e.g., formaldehyde); a dialdehyde (e.g., glutaraldehyde, hemiacetals or aldehyde releasing compounds); a diacid halide; a dihalide (e.g., dichlorides and dibromides); a polyacid anhydride (e.g., citric acid, epoxides, furfuraldehyde, glutaraldehyde or aldehyde condensates); and any combination thereof. In some embodiments, the multifunctional material may be mixed with the non-aqueous tackifying agent in an amount of from a lower limit of about 0.01%, 0.5%, 0.1%, 0.5%, 1%, 5%, 10%, and 15% to an upper limit of about 50%, 45%, 40%, 35%, 30%, 25%, 20%, and 15% by weight of the non-aqueous tackifying agent. In other embodiments, the multifunctional material may be mixed with the non-aqueous tackifying agent in an amount of from about 0.5% to about 1% by weight of the non-aqueous tackifying agent.

Aqueous tackifying agents suitable for use in the embodiments of the present disclosure are usually not generally significantly tacky when placed onto a proppant particulate, but are capable of being "activated" (e.g., destabilized, coalesced and/or reacted) to transform the compound into a sticky, tacky compound at a desirable time. This may permit an operator to design time-based magnetic proppant particulates that exhibit certain qualities (e.g., tackiness) only after activation. As used herein, the term "tacky," and all grammatical variants thereof, refers to a substance having a nature such that it is somewhat sticky to the touch and capable of being applied to a solid substrate (e.g., a proppant particulate). In some embodiments, a pretreatment may be first contacted with the surface of a proppant particulate to prepare it to be coated with an aqueous tackifying agent. Suitable aqueous tackifying agents may be charged polymers that comprise compounds that, when in a treatment fluid, will form a non-hardening coating (by itself or with an activator). In some embodiments, the aqueous tackifying agent, when coated onto a proppant particulate, will increase the continuous critical re-suspension velocity of the proppant particulate when included in a treatment fluid. The aqueous tackifying agent may enhance the grain-to-grain contact between the individual proppant particulates within the formation, helping bring about the consolidation of the proppant particulates into a cohesive, flexible, and permeable mass (e.g., a partial monolayer or a partial multilayer) upon curing.

Suitable aqueous tackifying agents may include any polymer that can bind, coagulate, or flocculate a proppant particulate. Also, polymers that function as pressure-sensitive adhesives may be suitable. Examples of aqueous tackifying agents suitable for use in the embodiments herein may include, but are not limited to, an acrylic acid polymer, an acrylic acid ester polymer, an acrylic acid derivative polymer, an acrylic acid homopolymer, an acrylic acid ester homopolymer (e.g., poly(methyl acrylate), poly(butyl acrylate), poly(2-ethylhexyl acrylate), and the like), an acrylic acid ester co-polymer, a methacrylic acid derivative polymer, a methacrylic acid homopolymer, a methacrylic acid ester homopolymer (e.g., poly(methyl methacrylate), poly (butyl methacrylate), poly(2-ethylhexyl methacrylate), and the like), an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, and any combination thereof. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds.

Aqueous tackifying agents may comprise at least one member selected from the group consisting of benzyl coco di-(hydroxyethyl) quaternary amine, p-T-amyl-phenol condensed with formaldehyde, and a copolymer comprising from about 80% to about 100% $C_1$-$C_{30}$ alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. The term "copolymer," as used herein, is not limited to polymers comprising two types of monomeric units, but includes any combination of monomeric units, e.g., terpolymers, tetrapolymers, and the like.

Suitable hydrophillic monomers may be any monomer that will provide polar oxygen-containing or nitrogen-containing groups. Suitable hydrophillic monomers may include, but are not limited to, dialkyl amino alkyl (meth) acrylates and their quaternary addition and acid salts, acrylamide, N-(dialkyl amino alkyl) acrylamide, methacrylamides and their quaternary addition and acid salts, hydroxy alkyl (meth)acrylates, unsaturated carboxylic acids such as methacrylic acid or acrylic acid, hydroxyethyl acrylate, acrylamide, and the like. Combinations of these may be suitable as well. These copolymers can be made by any suitable emulsion polymerization technique.

Resins suitable for use as a stabilization agent of the embodiments of the present disclosure may include any resin capable of forming a hardened, consolidated mass upon curing. Many such resins are commonly used in subterranean operations, and some suitable resins may include, but are not limited to, two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, silicon-based resins, polyester resins and hybrids and copolymers thereof, polyurethane resins and hybrids and copolymers thereof, acrylate resins, silicon-based resins, and any combination thereof.

Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than about 121° C. (about 250° F.), but will cure under the effect of time and temperature, as well as a subterranean formation having a formation temperature above about 121° C. (about 250° F.), preferably above about 149° C. (about 300° F.). It is within the ability of one skilled in the art, with the benefit of this disclosure, to select a suitable resin for use in embodiments of the present disclosure and to determine whether a catalyst is required to trigger curing. By way of example, a silicon-based resin system as may be used as a more eco-friendly choice in cases where epoxy or furan-based resins pose environmental concerns.

Any solvent that is compatible with the resin and achieves the desired viscosity effect is suitable for use in the embodiments of the present disclosure, such as to prepare the resin to coat the proppant particulates. Suitable solvents may include, but are not limited to, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and butylglycidyl ether, and any combination thereof. Other solvents may include, but are not limited to, aqueous dissolvable solvents such as, methanol, isopropanol, butanol, and glycol ether solvents, and combinations thereof. Suitable glycol ether solvents may include, but are not limited to, diethylene glycol methyl ether, dipropylene glycol methyl ether, 2-butoxy ethanol, ethers of a C2 to C6 dihydric alkanol containing at least one C1 to C6 alkyl group, mono ethers of dihydric alkanols, methoxypropanol, butoxyethanol, and hexoxyethanol, and isomers thereof. Selection of an appropriate solvent is dependent on the resin composition chosen and is within the ability of one skilled in the art, with the benefit of this disclosure. It is within the ability of one skilled in the art, with the benefit of this disclosure, to determine whether and how much solvent is needed to achieve a suitable viscosity.

Suitable silyl-modified polyamide compounds that may be used as a stabilization agent in the embodiments of the present disclosure are those that are substantially self-hardening compositions capable of at least partially adhering to a surface of a proppant particulate in an unhardened state, and that are further capable of self-hardening into a substantially non-tacky state. Such silyl-modified polyamides may be based, for example, on the reaction product of a silating compound with a polyamide or a combination of polyamides. The polyamide or combination of polyamides may be one or more polyamide intermediate compounds obtained, for example, from the reaction of a polyacid (e.g., diacid or higher) with a polyamine (e.g., diamine or higher) to form a polyamide polymer with the elimination of water.

In other embodiments, the stabilization agent comprises crosslinkable aqueous polymer compositions. Generally, suitable crosslinkable aqueous polymer compositions comprise an aqueous solvent, a crosslinkable polymer, and a crosslinking agent. The aqueous solvent may be any aqueous solvent in which the crosslinkable composition and the crosslinking agent may be dissolved, mixed, suspended, or dispersed to facilitate gel formation. For example, the aqueous solvent used may be freshwater, salt water, brine, seawater, or any other aqueous liquid that does not adversely react with the other components used in accordance with this disclosure or with a subterranean formation.

Examples of crosslinkable aqueous polymer compositions for use as the stabilization agents described herein may include, but are not limited to, carboxylate-containing polymers and acrylamide-containing polymers. The most suitable polymers are thought to be those that would absorb or adhere to proppant particulate surfaces and hold the magnetic particles in place on the proppant particulates. Examples of suitable acrylamide-containing polymers may include, but are not limited to, polyacrylamide, partially hydrolyzed polyacrylamide, copolymers of acrylamide and acrylate, carboxylate-containing terpolymers, tetrapolymers of acrylate, and any combination thereof. Additional examples of suitable crosslinkable aqueous polymers may include, but are not limited to, hydratable polymers comprising polysaccharides and derivatives thereof, and that contain one or more of the monosaccharide units: galactose, mannose, glucoside, glucose, xylose, arabinose, fructose, glucuronic acid, or pyranosyl sulfate. Suitable natural hydratable polymers may include, but are not limited to, guar gum, locust bean gum, tara gum, konjak, tamarind, starch, cellulose, karaya, xanthan, tragacanth, and carrageenan, any derivative thereof, and any combination thereof.

Suitable hydratable synthetic polymers and copolymers that may be used as the crosslinkable aqueous polymer compositions may include, but are not limited to, polycarboxylates (e.g., polyacrylates and polymethacrylates), polyacrylamides, methylvinyl ether polymers, polyvinyl alcohols, polyvinylpyrrolidone, any derivative thereof, and any combination thereof. The crosslinkable polymer used should be included in the crosslinkable aqueous polymer composition in an amount sufficient to form the desired gelled substance for coating onto a proppant particulate. In some embodiments, the crosslinkable polymer may be included in the crosslinkable aqueous polymer composition in an amount in the range of from a lower limit of about 1%, 2%, 3%, 4%, 5%, 6%, 7%, 8%, 9%, 10%, 11%, 12%, 13%, 14%, and 15% to an upper limit of about 30%, 29%, 28%, 27%, 26%, 25%, 24%, 23%, 22%, 21%, 20%, 19%, 18%, 17%, 16%, and 15% by weight of the aqueous solvent, encompassing any value and subset therebetween. In another embodiment, the crosslinkable polymer may be included in the crosslinkable aqueous polymer composition in an amount in the range of from about 1% to about 20% by weight of the aqueous solvent.

The crosslinkable aqueous polymer compositions of the embodiments described herein further comprise a crosslinking agent for crosslinking the crosslinkable polymers to form the desired gelled substance for coating onto the proppant particulates. In some embodiments, the crosslinking agent is a molecule or complex containing a reactive transition metal cation. In some embodiments, the crosslinking agent may comprise trivalent chromium cations complexed or bonded to anions, atomic oxygen, or water. Examples of suitable crosslinking agents may include, but are not limited to, compounds or complexes containing chromic acetate and/or chromic chloride. Other suitable transition metal cations may include, but are not limited to, chromium VI within a redox system, aluminum III, iron II, iron III, and zirconium IV. Combinations of these crosslinking agents may also be suitable.

The crosslinking agent may be present in the crosslinkable aqueous polymer compositions of the embodiments of the present disclosure in an amount sufficient to provide, among other things, the desired degree of crosslinking. In some embodiments, the crosslinking agent may be present in the crosslinkable aqueous polymer compositions in an amount in the range of from a lower limit of about 0.01%, 0.025%, 0.05%, 0.075%, 0.1%, 0.25%, 0.5%, 0.75%, 1%, 1.25%, 1.5%, 1.75%, 2%, and 2.25% to an upper limit of about 5%, 4.75%, 4.5%, 4.25%, 4%, 3.75%, 3.5%, 3.25%, 3%, 2.75%, 2.5%, and 2.25% by weight of the crosslinkable aqueous polymer composition, encompassing any value and subset therebetween. The exact type and amount of crosslinking agent or agents used depends upon the specific crosslinkable polymer to be crosslinked, formation conditions, if crosslinked downhole, and the like.

Optionally, the crosslinkable aqueous polymer compositions may further comprise a crosslinking delaying agent, such as a polysaccharide crosslinking delaying agent derived from guar, guar derivatives, cellulose derivatives, or combinations thereof. The crosslinking delaying agent may be included in the crosslinkable aqueous polymer compositions, among other things, to delay crosslinking of the crosslinkable aqueous polymer compositions until desired (e.g., to control the timing of the curing of the stabilization agent to form consolidated aggregates of magnetic proppant particulates).

In other embodiments, the stabilization agent may comprise polymerizable organic monomer compositions. Generally, suitable polymerizable organic monomer compositions comprise an aqueous fluid, a water-soluble polymerizable organic monomer, an oxygen scavenger, and a primary initiator. The aqueous fluid component of the polymerizable organic monomer composition generally may be freshwater, salt water, brine, seawater, or any other aqueous liquid that does not adversely react with the other components used in accordance with this disclosure, including those provided as part of the treatment fluid and/or spacer fluid of described herein below.

A variety of monomers may be suitable for use as the water-soluble polymerizable organic monomers in the embodiments of the present disclosure. Examples of suitable monomers may include, but are not limited to, acrylic acid, methacrylic acid, acrylamide, methacrylamide, 2-methacrylamido-2-methylpropane sulfonic acid, dimethylacrylamide, vinyl sulfonic acid, N,N-dimethylaminoethylmethacrylate, 2-triethylammoniumethylmethacrylate chloride, N,N-dimethyl-aminopropylmethacryl-amide, methacrylamidepropyltriethylammonium chloride, N-vinyl pyrrolidone, vinylphosphonic acid, and methacryloyloxyethyl trimethylammonium sulfate, and any combination thereof. In some embodiments, the water-soluble polymerizable organic monomer should be self-crosslinking. Examples of suitable monomers which are thought to be self-crosslinking may include, but are not limited to, hydroxyethylacrylate, hydroxymethylacrylate, hydroxyethylmethacrylate, N-hydroxymethylacrylamide, N-hydroxymethyl-methacrylamide, polyethylene amine, polyethylene glycol acrylate, polyethylene glycol methacrylate, polypropylene glycol acrylate, and polypropylene glycol methacrylate, and any combination thereof. Of these, hydroxyethylacrylate may be preferred in some instances. An example of a particularly suitable monomer is hydroxyethylcellulose-vinyl phosphoric acid.

The water-soluble polymerizable organic monomer (or monomers where a combination thereof is used) should be included in the polymerizable organic monomer composition in an amount sufficient to form the desired gelled substance after placement on the particulates described herein. In some embodiments, the water-soluble polymerizable organic monomer may be included in the polymerizable organic monomer composition in an amount in the range of from a lower limit of about 1%, 2%, 4%, 6%, 8%, 10%, 12%, 14%, and 16% to an upper limit of about 30%, 28%, 26%, 24%, 22%, 20%, 18%, and 16% by weight of the aqueous fluid, encompassing any value and any subset therebetween. In another embodiment, the water-soluble polymerizable organic monomer may be included in the polymerizable organic monomer composition in an amount in the range of from about 1% to about 20% by weight of the aqueous fluid.

The presence of oxygen in the polymerizable organic monomer composition may inhibit the polymerization process of the water-soluble polymerizable organic monomer or monomers, which may allow control over (e.g., delay) the curing of the polymerizable organic monomer composition to form consolidated magnetic proppant particulate aggregates. In some embodiments, an oxygen scavenger, such as stannous chloride, may be included in the polymerizable monomer composition. In order to improve the solubility of stannous chloride so that it may be readily combined with the polymerizable organic monomer composition, the stannous chloride may be pre-dissolved in a hydrochloric acid solution. For example, the stannous chloride may be dissolved in about a 0.1% by weight aqueous hydrochloric acid solution in an amount of about 10% by weight of the resulting solution. The resulting stannous chloride-hydrochloric acid solution may be included in the polymerizable organic monomer composition in an amount in the range of from a lower limit of about 0.005%, 0.01%, 0.1%, 0.5%, 1%, 1.5%, 2%, 2.5%, 3%, 3.5%, 4%, and 4.5% to an upper limit about 10%, 9.5%, 9%, 8.5%, 8%, 7.5%, 7%, 6.5%, 6%, 5.5%, 5%, and 4.5% by weight of the polymerizable organic monomer composition, encompassing any value and any subset therebetween. Generally, the stannous chloride may be included in the polymerizable organic monomer composition of the embodiments of the present disclosure in an amount in the range of from about 0.005% to about 0.1% by weight of the polymerizable organic monomer composition.

A primary initiator may be used, among other things, to initiate curing (i.e., polymerization) of the water-soluble polymerizable organic monomer(s). Any compound or compounds that form free radicals in aqueous solution may be used as the primary initiator. The free radicals may act, among other things, to initiate polymerization of the water-soluble polymerizable organic monomer present in the polymerizable organic monomer composition. Compounds suitable for use as the primary initiator may include, but are not limited to, alkali metal persulfates, peroxides, oxidation-reduction systems employing reducing agents (e.g., sulfites in combination with oxidizers), azo polymerization initiators, and any combination thereof. Suitable azo polymerization initiators may include, but are not limited to, 2,2'-azobis(2-imidazole-2-hydroxyethyl) propane, 2,2'-azobis(2-aminopropane), 4,4'-azobis(4-cyanovaleric acid), 2,2'-azobis(2-methyl-N-(2-hydroxyethyl) propionamide, and any combination thereof. Generally, the primary initiator should be present in the polymerizable organic monomer composition in an amount sufficient to initiate polymerization of the water-soluble polymerizable organic monomer(s). In certain embodiments, the primary initiator may be present in the polymerizable organic monomer composition in an amount in the range of from a lower limit of about 0.1%, 0.2%, 0.4%, 0.6%, 0.8%, 1%, 1.2%, 1.4%, 1.6%, 1.8%, 2%, 2.2%, 2.4%, and 2.6% to an upper limit of about 5%, 4.8%, 4.6%, 4.4%, 4.2%, 4%, 3.8%, 3.6%, 3.4%, 3.2%, 3%, 2.8%, and 2.6% by weight of the water-soluble polymerizable organic monomer(s), encompassing any value and any subset therebetween. One skilled in the art, with the benefit of this disclosure, will recognize that as the polymerization temperature increases, the required level of activator decreases.

Optionally, the polymerizable organic monomer compositions further may comprise a secondary initiator. A secondary initiator may be used, for example, where the polymerizable organic monomer composition is placed into a subterranean formation that is relatively cool as compared to the surface, such as when placed below the mud line in offshore operations. The secondary initiator may be any suitable water-soluble compound or compounds that may react with the primary initiator to provide free radicals at a lower temperature. An example of a suitable secondary initiator is triethanolamine. In some embodiments, the secondary initiator is present in the polymerizable organic monomer composition in an amount in the range of from a lower limit of about 0.1%, 0.2%, 0.4%, 0.6%, 0.8%, 1%, 1.2%, 1.4%, 1.6%, 1.8%, 2%, 2.2%, 2.4%, and 2.6% to an upper limit of about 5%, 4.8%, 4.6%, 4.4%, 4.2%, 4%, 3.8%, 3.6%, 3.4%, 3.2%, 3%, 2.8%, and 2.6% by weight of the water-soluble polymerizable organic monomer(s), encompassing any value and any subset therebetween.

Also optionally, the polymerizable organic monomer compositions of the embodiments of the present disclosure may further comprise a crosslinker for crosslinking the polymerizable organic monomer compositions (e.g., into a gelled substance). In some embodiments, the crosslinker may be any crosslinker capable of crosslinking the polymerizable organic monomer composition that does not adversely interfere with the components of the magnetic proppant particulates, the treatment fluids, or the spacer fluids described herein. Examples of suitable crosslinking agents include those discussed previously with reference to crosslinkable aqueous polymer compositions. Generally, the crosslinker may be present in polymerizable organic monomer compositions in an amount in the range of from a lower limit of about 0.01%, 0.02%, 0.04%, 0.06%, 0.08%, 0.1%, 0.2%, 0.4%, 0.6%, 0.8%, 1%, 1.2%, 1.4%, 1.6%, 1.8%, and 2% to an upper limit of about 5%, 4.8%, 4.6%, 4.4%, 4.2%, 4%, 3.8%, 3.6%, 3.4%, 3.2%, 3%, 2.8%, 2.6%, 2.4%, 2.2%, and 2% by weight of the polymerizable organic monomer composition, encompassing any value and any subset therebetween.

In some embodiments, the stabilization agent may comprise a binder. Suitable binders may generally comprise 1) a hydrolysate or heterocondensate of at least one hydrolysable silicon compound and at least one metal, phosphorus or boron compound, the metal being selected from Al, Ge, Sn, Pb, Ti, Mg, Li, V, Nb, Ta, Zr and Hf; 2) an organic polymerizable or polycondensable monomer or oligomer; and, 3) a buffer, so that the pH of the buffered binder is in the range from 2 to 7, and optionally a complexing agent, if appropriate, the at least one hydrolysable silicon compound comprising one or more hydrolysable silicon compounds having at least one nonhydrolysable group or oligomers thereof. Such binders are suitable for consolidating bulk or loose substrates.

Other binders suitable for using the embodiments of the present disclosure may generally comprise:

(I) a consolidant comprising a hydrolyzate or precondensate of:

(a) at least one organosilane of the general Formula IV:

RnSiX4-n        Formula IV in which the R radicals are the same or different and are each hydrolytically non-removable groups, the X radicals are the same or different and are each hydrolytically removable groups or hydroxyl groups and n is 1, 2 or 3, (b) optionally at least one hydrolyzable silane of the general Formula V:

SiX4        Formula V in which the X radicals are each as defined above, and (c) at least one metal compound of the general Formula VI:

MXa        Formula VI in which M is a metal of main groups I to VIII or of transition groups II to VIII of the Periodic Table of the Elements including boron, X is as defined in Formula IV, where two X groups may be replaced by one oxo group, and a corresponds to the valence of the element, where the molar ratio of silicon compounds used to metal compounds used is in the range from 8000:1 to 8:1, is infiltrated or injected into the geological formation and, (II) the stabilization agent is cured under elevated pressure and elevated temperature, where the stabilization agent, in the case that it is used to change the wetting behavior of the formation, also comprises an oleophobic and hydrophobic component. Comprehensive investigations have shown that these stabilization agents are not decomposed even in autoclaves at high pressure and high temperature even over a prolonged period, and also still form a stable bond under these conditions. In the case of use of a wetting-regulating stabilization agent variant, it was shown that the wetting behavior established is retained after a hydrothermal treatment in corrosive medium. The consolidation also reduces the porosity only to a slight degree.

Suitable silicon-based resins for use as the stabilization agents described herein may include polysiloxanes, which are liquid substances having low viscosity, excellent curing workability, and excellent heat resistance once cured. Suitable polysiloxanes may be obtained by hydrolysis and polycondensation of a silicon compound having three hydrolyzable groups, a silicon compound having two hydrolyzable groups and a silicon compound having one hydrolyzable group. Suitable polysiloxanes have a hydrosilylatable carbon-carbon unsaturated group, a hydrosilyl group (a group containing Si—H bond) and an alkoxysilyl group, and have a number-average molecular weight of 500 to 20,000, and that is obtained by conducting a hydrolysis and polycondensation reaction of a silicon compound (T) having three hydrolyzable groups, a silicon compound (D) having two hydrolyzable groups, and a silicon compound (M) having one hydrolyzable group. The polysiloxane of the embodiments of the present disclosure may be a compound that has a silsesquioxane unit (hereinafter referred to as a "structural unit T") deriving from the silicon compounds (T), (D) and (M), a silicone unit (hereinafter referred to as a "structural unit D"), and a monofunctional siloxane unit (hereinafter referred to as a "structural unit M").

At least one compound of the silicon compound (T), the silicon compound (D), and the silicon compound (M) has a hydrosilyl group among the silicon compounds (T), (D) and (M), and at least one compound of the silicon compound (T), the silicon compound (D), and the silicon compound (M) has a hydrosilylatable carbon-carbon unsaturated group. This unsaturated group usually binds to a silicon atom and is an organic group having carbon atoms of 2 to 10 containing a double bond or a triple bond. Specific examples of the unsaturated group may include, but are not limited to, a vinyl group, an ortho styryl group, a meta styryl group, a para styryl group, an acryloyl group, a methacryloyl group, an acryloxy group, a methacryloxy group, a 1-propenyl group, a 1-butenyl group, a 1-pentenyl group, a 3-methyl-1-butenyl group, a phenylethenyl group, an ethynyl group, a 1-propynyl group, a 1-butynyl group, a 1-pentinyl group, a 3-methyl-1-butynyl group, a phenylbutynyl group, and the like, and any combination thereof.

The silicon compound having the unsaturated group may have only one unsaturated group or two or more unsaturated groups. In the case where the compound has two or more unsaturated groups, the unsaturated groups may be the same or different from each other. Additionally, the two or more unsaturated groups may be bound to the same silicon atom or to a plurality of silicon atoms. It is noted that when a polysiloxane obtained using a silicon compound in which the unsaturated group is bound to the same silicon atom is subjected to curing, an unreacted vinyl group may easily remain due to steric hindrance, and heat resistance might become insufficient. Therefore, the silicon compound having the unsaturated group is preferably a compound in which one unsaturated group is bound to one silicon atom.

Other suitable silicon-based resins include (a) a compound comprising a reactive group of Formula I:

—X—SiR''$_x$(OR')$_{3-z}$     Formula I wherein X comprises a hydrocarbon chain; wherein x=0 to 2 and z=0 to 2; wherein R' and R'' comprises hydrogen, a halogen, an amide, an amide, a hydrocarbon chain, carboxy (e.g., acetoxy), alkoxy (e.g., ethoxy, methoxy), a hydrocarbon chain comprising a heteroatom, and/or a hydrocarbon chain comprising a carbonyl group; and wherein when x is 2, then each R'' may be the same (identical) or different; and wherein when z is 0 or 1, then each R' may be the same or different; and (b) a polysiloxane comprising a reactive functional group that comprises at least one of the following structural units of Formula II:

R1$_n$R2$_m$SiO$_{(4-n-m)/2}$     Formula II wherein R1 comprises hydrogen, hydroxyl, a hydrocarbon chain, or a siloxane chain; wherein R2 comprises a functional group; and wherein m and n fulfill the requirements of 0<n<4, 0<m<4 and 2<(m+n)<4; and wherein when n>1, then each R1 may be the same or different; and wherein when m>1, then each R2 may be the same or different. In certain embodiments, the functional group of R2 comprises hydroxyl, carboxyl, isocyanate, blocked (poly)isocyanate, primary amine, secondary amine, amide, carbamate, urea, urethane, vinyl, unsaturated ester, maleimide, fumarate, anhydride, hydroxyl alkylamide, epoxy, or combinations thereof.

Other suitable silicon-based resins may include a compound comprising an organofunctional polysiloxane polymer as a binding resin obtaining the polymeric structure as part of a curing mechanism or a combination thereof. The curing mechanism of such siloxane coatings is a two-step mechanism. First, a hydrolysable group attached to the silicon atom is split off in a reaction with water, to form a silanol. The silanol then reacts with another silanol in a condensation reaction to form a silicon-oxygen-silicon chemical bonding which is characteristic for siloxane coatings. The hydrolysable group can be a halogen, ketoxime or acetoxy groups, but the most common is alkoxy group. Suitable such silicon-based resins comprise:

a) a polysiloxane having the following Formula III:

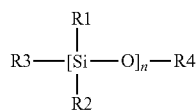

Formula III wherein, for each repeating polymer unit, R1, R2 and R3 are independently selected from the group consisting of alkyl, aryl, reactive glycidoxy groups having up to 20 carbon atoms, and OSi(OR5)3 groups, wherein each R5 independently has the same meaning as R1, R2 or R3, and R4 is either alkyl, aryl or hydrogen, and wherein n is selected such that the molecular weight of the polysiloxane is in the range of 500 to 2000; and, b) an organo functional silane with two hydrolysable groups having the formula wherein R1 is selected from the group consisting of alkyl, aryl, reactive glycidoxy, amino, mercapto, vinyl, isocyanate or methacrylate groups having up to 20 carbon atoms; R2 is selected from the group consisting of reactive glycidoxy, amino, mercapto, vinyl, isocyanate or methacrylate groups having up to 20 carbon atoms; and R3 and R4 are halogen or alkoxy, ketoxime or acetoxy groups having up to six carbon atoms; wherein the coating composition has a solids content of at least 60% by weight.

Still other suitable silicon-based resins may comprise a silane coupling agent and a polymer having a reactive silicon end group. In some embodiments, these suitable silicon-based resins may also include a catalyst operable to facilitate the curing of the polymer, a diluent, a dehydrating agent, and/or a filler material. Generally, any suitable polymer that can be prepared with reactive silicon end groups may be used. Examples of suitable polymers may include, but are not limited to, a polyalkyl (e.g., polyethers, polyalkanes, polyalkenes, polyalkynes, and the like), a substituted alkyl monomer (e.g., styrene), an acrylic, and any combination thereof. Examples of suitable reactive silicon end groups may include, but are not limited to, triethoxysilanes, methyldiethoxysilanes, trisilanols, alkoxysilanes, substituted silanes, multi-silanols, and any combination thereof. One suitable polymer having a reactive silicon end group that may be used in particular embodiments of the present disclosure is a silane-modified poly(propylene oxide) oligomer.

Generally, any suitable silane coupling agent may be used in accordance with particular embodiments of the present disclosure. Examples of suitable silane coupling agents may include, but are not limited to, N-2-(aminoethyl)-3-aminopropyltrimethoxysilane, 3-glycidoxypropyltrimethoxysilane, gamma-aminopropyltriethoxysilane, N-beta-(aminoethyl)-gamma-aminopropyltrimethoxysilanes, aminoethyl-N-beta-(aminoethyl)-gamma-aminopropyl-trimethoxysilanes, gamma-ureidopropyl-triethoxysilanes, beta-(3-4 epoxy-cyclohexyl)-ethyl-trimethoxysilane, gamma-glycidoxypropyltrimethoxysilane, vinyltrichlorosilane, vinyltris (beta-methoxyethoxy) silane, vinyltriethoxysilane, vinyltrimethoxysilane, 3-metacryloxypropyltrimethoxysilane, beta-(3,4 epoxycyclohexyl)-ethyltrimethoxysilane, r-glycidoxypropyltrimethoxysilane, r-glycidoxypropylmethylidiethoxysilane, N-beta-(aminoethyl)-r-aminopropyltrimethoxysilane, N-beta-(aminoethyl)-r-aminopropylmethyldimethoxysilane, 3-aminopropyl-triethoxysilane, N-phenyl-r-aminopropyltrimethoxysilane, r-mercaptopropyltrimethoxysilane, r-chloropropyltrimethoxysilane, vinyltris (beta-methoxyethoxy) silane, r-metacryloxypropyltrimethoxysilane, r-glycidoxypropyltrimethoxysilane, r-glycidoxypropylmethylidiethoxysilane, N-beta-(aminoethyl)-r-aminopropyltrimethoxysilane, N-beta-(aminoethyl)-r-aminopropylmethyldimethoxysilane, r-aminopropyltriethoxysilane, N-[3-(trimethoxysilyl)propyl]-ethylenediamine, substituted silanes where one or more of the substitutions contains a different functional group, and any combination thereof.

In some embodiments, the silane coupling agent may be present in the silicon-based resin composition in an amount of from a lower limit of about 0.1%, 0.2%, 0.3%, 0.4, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, and 2.5% to an upper limit of about 5%, 4.9%, 4.8%, 4.7%, 4.6%, 4.5%, 4.4%, 4.3%, 4.2%, 4.1%, 4%, 3.9%, 3.8%, 3.7%, 3.6%, 3.5%, 3.4%, 3.3%, 3.2% 3.1%, 3%, 2.9%, 2.8%, 2.7%, 2.6%, and 2.5% by weight of the composition, and preferably in an amount from about 0.5% to about 3% by weight of the composition, encompassing any value and any subset therebetween.

In some embodiments, the stabilization agent may comprise a zeta potential-modifying aggregating composition, which can modify the zeta potential or aggregation potential of a proppant particulate surface. Such modifications can permit any two surfaces (e.g., of two or more proppant particulates) to have a greater attraction for one another.

Zeta potential-modifying aggregating compositions suitable for use in the embodiments of the present disclosure may include, but are not limited to, a reaction product of an amine and a phosphate ester, where the zeta potential-modifying aggregating composition is designed to coat a proppant particulate surface to change the zeta potential or aggregation potential of the surface of a proppant particulate.

Suitable amines may include, but are not limited to, any amine that is capable of reacting with a suitable phosphate ester to form a composition that forms a deformable coating on a proppant particulate surface. Exemplary examples of such amines may include, but are not limited to, any amine of the general formula R1, R2NH or mixtures or combinations thereof, where R1 and R2 are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur, and any combination thereof and where one or more of the hydrogen atoms can be replaced by one or more single valence atoms selected from the group consisting of fluorine, chlorine, bromine, iodine, and any combination thereof. Exemplary examples of amines suitable for use in the embodiments herein may include, but are not limited to, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixtures of alkyl indoles, imidazole and alkyl imidazole or mixtures of alkyl imidazole, quinoline and alkyl quinoline or mixtures of alkyl quinoline, isoquinoline and alkyl isoquinoline or mixtures of alkyl isoquinoline, pyrazine and alkyl pyrazine or mixtures of alkyl pyrazine, quinoxaline and alkyl quinoxaline or mixtures of alkyl quinoxaline, acridine and alkyl acridine or mixtures of alkyl acridine, pyrimidine and alkyl pyrimidine or mixtures of alkyl pyrimidine, quinazoline and alkyl quinazoline or mixtures of alkyl quinazoline, and any combination thereof.

Suitable phosphate esters may include, but are not limited to, any phosphate ester that is capable of reacting with a suitable amine to form a composition that forms a deformable coating on a proppant particulate surface. Exemplary examples of such phosphate esters may include, but are not limited to, any phosphate esters of the general formula P(O)(OR3)(OR4)(OR5) or mixtures or combinations thereof, where R3, R4, and OR5 are independently a hydrogen atom or a carbyl group having between about 1 and 40 carbon atoms, and the required hydrogen atoms to satisfy the valence and where one or more of the carbon atoms can be replaced by one or more hetero atoms selected from the group consisting of boron, nitrogen, oxygen, phosphorus, sulfur, and any combination thereof; and where one or more of the hydrogen atoms can be replaced by one or more single valence atoms selected from the group consisting of fluorine, chlorine, bromine, iodine, and any combination thereof. Exemplary examples of phosphate esters may include, but are not limited to, phosphate ester of alkanols having the general formula P(O)(OH)x(OR6)y where x+y=3 and are independently a hydrogen atom or a carbyl group having between about 1 and 40 carbon atoms, and the required hydrogen atoms to satisfy the valence and where one or more of the carbon atoms can be replaced by one or more hetero atoms selected from the group consisting of boron, nitrogen, oxygen, phosphorus, sulfur, and any combination thereof; and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates, and any combination thereof.

Other exemplary examples of phosphate esters may include, but are not limited to, phosphate esters of alkanol amines having the general formula N[R7OP(O)(OH)2]3 where R7 is a carbenyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur, and any combination thereof; and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine, and any combination thereof. Other exemplary examples of phosphate esters may include, but are not limited to, phosphate esters of hydroxylated aromatics, such as phosphate esters of alkylated phenols such as nonylphenyl phosphate ester or phenolic phosphate esters. Other exemplary examples of phosphate esters may include, but are not limited to, phosphate esters of diols and polyols such as phosphate esters of ethylene glycol, propylene glycol, or higher glycolic structures. Other exemplary phosphate esters may include, but are not limited to, any phosphate ester that can react with an amine and be coated on to a proppant particulate surface that forms a deformable coating enhancing the aggregating potential of the proppant particulate surface.

In some embodiments, the stabilization agent may comprise a stabilization agent emulsion that comprises an aqueous fluid, an emulsifying agent, and a stabilization agent. The stabilization agent in suitable emulsions may be either a non-aqueous tackifying agent or a resin, such as those described above. These stabilization agent emulsions have an aqueous external phase and organic-based internal phase. The term "emulsion" and all grammatical variants thereof, as used herein, refers to a combination of two or more immiscible phases and includes, but is not limited to, dispersions and suspensions.

Suitable stabilization agent emulsions comprise an aqueous external phase comprising an aqueous fluid. Suitable aqueous fluids that may be used in the stabilization agent emulsions of the embodiments of the present disclosure include freshwater, salt water, brine, seawater, or any other aqueous fluid that, preferably, does not adversely react with the other components used in accordance with this disclosure or with the subterranean formation, including those listed above with reference to the aqueous base fluids included in the treatment fluids described herein. One should note, however, that if long-term stability of the emulsion is desired, a more suitable aqueous fluid may be one that is substantially free of salts. It is within the ability of one skilled in the art, with the benefit of this disclosure, to determine if and how much salt may be tolerated in the stabilization agent emulsions of the embodiments of the present disclosure before it becomes problematic for the stability of the emulsion.

The aqueous fluid may be present in the stabilization agent emulsions in an amount in the range of from a lower limit of about 20%, 22%, 24%, 26%, 28%, 30%, 32%, 34%, 36%, 38%, 40%, 42%, 44%, 46%, 48%, 50%, 52%, 54%, 56%, 58%, and 60% to an upper limit of about 99.9%, 98%, 96%, 94%, 92%, 90%, 88%, 86%, 84%, 82%, 80%, 78%, 76%, 74%, 72%, 70%, 68%, 66%, 64%, 62%, and 60% by weight of the stabilization agent emulsion composition, encompassing any value and any subset therebetween. In some embodiments, the aqueous fluid may be present in the stabilization agent emulsions in an amount in the range of about 60% to 99.9% by weight of the stabilization agent emulsion composition. In other embodiments, the aqueous fluid may be present in the stabilization agent emulsions in an amount in the range of about 95% to 99.9% by weight of the stabilization agent emulsion composition.

The stabilization agent in the emulsion may be either a non-aqueous tackifying agent or a resin, such as those described above. The stabilization agents may be present in a stabilization agent emulsion in an amount in the range of from a lower limit of about 0.1%, 1%, 5%, 10%, 15%, 20%, 25%, 30%, 35%, and 40% to an upper limit about 80%, 75%, 70%, 65%, 60%, 55%, 50%, 45%, and 40% by weight of the stabilization agent emulsion composition, encompassing any value and any subset therebetween. In some embodiments, the stabilization agent may be present in a stabilization agent emulsion in an amount in the range of about 0.1% to about 40% by weight of the composition. In some embodiments, the stabilization agent may be present in a stabilization agent emulsion in an amount in the range of about 0.1% to about 5% by weight of the composition.

In certain embodiments, the stabilization agent emulsions may further comprise an emulsifying agent. Examples of suitable emulsifying agents may include, but are not limited to, surfactants, proteins, hydrolyzed proteins, lipids, glycolipids, and nano-sized particulates, including, but not limited to, fumed silica. Combinations of these may be suitable as well.

In some embodiments, the stabilization agent may also comprise an optional catalyst to facilitate curing. Generally, any suitable catalyst may be used with the stabilization agent described herein. Examples of suitable catalysts may include, but are not limited to, tertiary amine catalysts, titanium chelate catalysts, tin catalysts, lead catalysts, bismuth catalysts, and any combination thereof. One suitable catalyst that may be used in particular embodiments of the present disclosure is dibutylbis(2,4-pentanedionate-O,O')—, (OC-6-11). In some embodiments, the catalyst may be present in an amount from about 0.1%, 0.2%, 0.3%, 0.4, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, and 2.5% to an upper limit of about 5%, 4.9%, 4.8%, 4.7%, 4.6%, 4.5%, 4.4%, 4.3%, 4.2%, 4.1%, 4%, 3.9%, 3.8%, 3.7%, 3.6%, 3.5%, 3.4%, 3.3%, 3.2% 3.1%, 3%, 2.9%, 2.8%, 2.7%, 2.6%, and 2.5% by weight of the stabilization agent, and preferably in an amount from about 1% to about 3% by weight of the composition, encompassing any value and any subset therebetween.

In some embodiments, the magnetic proppant particulates may be used in methods relating to subterranean formation operations, such as fracturing operations. For example, in one embodiment, the present disclosure provides for a method of treating a subterranean formation comprising preparing a treatment fluid comprising a base fluid and the magnetic proppant particulates described herein. A spacer fluid is also prepared comprising a base fluid, a gelling agent, and a breaker, wherein the spacer fluid is substantially solids-free or further comprises micro-proppant.

The treatment fluid and the spacer fluid may be introduced intermittently (e.g., alternatingly) into a subterranean formation (e.g., a wellbore) having at least one fracture therein so as to alternate the placement of the placement of the magnetic proppant particulates and the spacer fluid in the fracture. Ideally, the density or chemistry of the treatment fluid and the spacer fluid is such that the two fluids do not substantially intermix, such that breaking the spacer fluid results in a substantially magnetic proppant particulate-free channel, as discussed in more detail below. The magnetic particles on the proppant particulates may be activated, either prior to or after intermittently introducing the treatment fluid and the spacer fluid into the subterranean formation for placement in the fracture. As discussed previously, activation prior to the introduction into the subterranean formation may take place at any point in time after coating of both the including prior to coating the stabilization composition and/or magnetic particles onto the proppant particulates. Activation of the magnetic proppant particulates causes them to agglomerate into masses bound by the magnetic attraction of the magnetic particles coated thereon and, in some instances, the tackiness or adhesion properties of the stabilization agent also coated thereon.

The magnetic proppant particulates in the fracture then form agglomerated aggregates and the spacer fluid between each of the portions of the treatment fluid comprising the agglomerated magnetic proppant particulates ensures that a magnetic proppant particulate-free or substantially magnetic proppant particulate-free channels are formed (with spacer fluid) between the agglomerated magnetic proppant particulates. The channels may also be substantially free of other solid particulate matter, such as that naturally within a subterranean formation or, as discussed in greater detail below, may comprise micro-proppant that does not substantially interfere with the flow of produced fluids through the channels. The agglomerated proppant particulates are capable of propping open in the fracture. The spacer fluid may be at least partially removed from the fracture and, in most instances, the subterranean formation itself by activating the breaker in the spacer fluid, such that the spacer fluid is no longer gelled and reverts to a thin fluid that can be removed, thereby leaving voids between magnetic proppant "pillars" through which produced fluids may flow. The spacer fluid is at least partially removed if greater than about 80% of the spacer fluid is removed from the fracture.

In some embodiments, the stabilization agent may be cured either before or after the spacer fluid is at least partially removed from the fracture and, in most instances, the subterranean formation. In some instances a portion of the stabilization agent may be cured before the spacer fluid is removed and a portion of the stabilization agent may be cured after the spacer fluid is removed (i.e., a combination of the foregoing timing), for example, if the stabilization agent is subjected to variable temperature or salinity conditions, two or more types of stabilization agents are used having variable curing times or conditions, and the like. Curing of the stabilization composition transforms the agglomerated magnetic proppant particulates, held together by magnetic attractive forces and, in some instances, the stabilization agent composition being contacted between adjacent magnetic proppant particulates, into a consolidated magnetic proppant particulate aggregate that generally does not become dispersed without the application of shear. These consolidated aggregates are typically more stable and solid than agglomerated magnetic proppant particulates prior to the curing of the stabilization agent, and operate as substantially solid masses that withstand fracture closure pressures as single (or multiple single) agglomerate(s).

The treatment fluids comprising the magnetic proppant particulates of the present disclosure may comprise any base fluid compatible with the magnetic proppant particulates and suitable for use in a subterranean formation operation. Such base fluids may be selected, for example, based on the one or more stabilization agents selected (e.g., aqueous v. non-aqueous), the type of magnetic field to be exposed to the magnetic proppant particulates to activate the magnetic particles coated thereon, and the like. In general, the base fluid may include, but not be limited to, oil-based fluids, aqueous-based fluids, aqueous-miscible fluids, water-in-oil emulsions, or oil-in-water emulsions.

Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. It should be noted that for water-in-oil and oil-in-water emulsions, any mixture of the above may be used including the water being and/or comprising an aqueous-miscible fluid.

The spacer fluids pumped intermittently with the treatment fluids comprising the magnetic proppant particulates, similar to the treatment fluid, also comprise a base fluid, in addition to a gelling agent and a breaker. The base fluid for use in the spacer fluids may be any of those discussed above with reference to the treatment fluids. Namely, without excluding the examples provided with reference to the treatment fluids, the base fluids for use in forming the spacer fluids described herein may include, but are not limited to, oil-based fluids, aqueous-based fluids, aqueous-miscible fluids, water-in-oil emulsions, and oil-in-water emulsions.

The gelling agents for use in gelling the spacer fluids (i.e., increasing the viscosity of the spacer fluids so as to form alternating fluid types within a fracture with the treatment fluid comprising the magnetic proppant particulates) may be any substance capable of gelling the spacer fluid, that does not adversely affect the other components of the fluids described herein (e.g., the magnetic proppant particulates), that may be used in a subterranean formation operation, and provided that the gelling agents are selected so as to render the treatment fluid and the spacer fluid substantially immiscible with one another. Suitable gelling agents may include, but are not limited to, natural polymers, synthetic polymers, and any combination thereof. The gelling agents may provide a viscous environment to separate columns of the treatment fluid in a fracture.

Suitable gelling agents may include, but are not limited to, polysaccharides, biopolymers, and/or derivatives thereof that contain one or more of these monosaccharide units: galactose, mannose, glucoside, glucose, xylose, arabinose, fructose, glucuronic acid, or pyranosyl sulfate. Examples of suitable polysaccharides may include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, and combinations thereof.

Suitable synthetic polymers may include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and derivatives and combinations thereof. In certain embodiments, the gelling agent comprises an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the spacer fluids useful described herein in an amount in the range of from a lower limit of about 0.1%, 0.25%, 0.5%, 0.75%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, and 5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, 5.5%, 5.25%, and 5% by weight of the liquid component of the spacer fluid, encompassing any value and subset therebetween. In certain embodiments, the gelling agents may be present in an amount in the range of from about 0.15% to about 2.5% by weight of the liquid component of the spacer fluid.

In some embodiments, it may be desirable to crosslink the gelling agent and the spacer fluids may further comprise one or more crosslinking agents. The crosslinking agents may comprise a borate ion, a metal ion, or similar component that is capable of crosslinking at least two molecules of the gelling agent. Examples of suitable crosslinking agents may include, but are not limited to, borate ions, magnesium ions, zirconium IV ions, titanium IV ions, aluminum ions, antimony ions, chromium ions, iron ions, copper ions, magnesium ions, zinc ions, and any combination thereof. These ions may be provided by providing any compound that is capable of producing one or more of these ions. Examples of such compounds may include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and any combination thereof.

In certain embodiments, the crosslinking agent may be formulated to remain inactive until it is "activated" by, among other things, certain conditions in the spacer fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The coating may be one or more of the encapsulating materials discussed previously with reference to encapsulating the magnetic proppant particulates described herein. The choice of a particular crosslinking agent will be governed by several considerations that recognized by one skilled in the art, including, but not limited, the type of gelling agent included, the molecular weight of the gelling agent(s), the conditions in the subterranean formation being treated, the safety handling requirements, the pH of the treatment fluid, temperature, and/or the desired delay for the crosslinking agent to crosslink the gelling agent molecules.

When included, suitable crosslinking agents may be present in the spacer fluids in an amount sufficient to provide the desired degree of crosslinking between molecules of the gelling agent. In certain embodiments, the crosslinking agent may be present in the spacer fluids in an amount in the range of from a lower limit of about 0.005%, 0.05%, 0.1%, 0.15%, 0.2%, 0.25%, 0.3%, 0.35%, 0.4%, 0.45%, and 0.5% to an upper limit of about 1%, 0.95%, 0.9%, 0.85%, 0.8%, 0.75%, 0.7%, 0.65%, 0.6%, 0.55%, and 0.5% by weight of the liquid component of the spacer fluid, encompassing any value and subset therebetween.

The spacer fluids of the present disclosure may further comprise a breaker capable of breaking the gelling effect of the gelling agent and/or crosslinking agents in conjunction with the gelling agent to disrupt it and cause it to revert to a thin fluid that can be removed at least partially from the fracture. In some embodiments, the breaker may be delayed by encapsulation with a coating (e.g., a porous coating through which the breaker may diffuse slowly, or a degradable coating that degrades downhole) that delays the release of the breaker. In other embodiments the breaker may be a degradable material (e.g. polylactic acid or polygylcolic acid) that releases an acid or alcohol in the present of an aqueous liquid. Suitable breakers for use in the treatment fluids described herein may include, but are not limited to, an oxidative breaker, an acid breaker, a delayed release acid breaker, a delayed release enzyme breaker, a temperature activated breaker, a hydrolysable ester breaker, any encapsulated in an encapsulating material, and any combination thereof.

Examples of oxidative breakers may include, but are not limited to, organic peroxides, alkali metal persulfates, alkali metal chlorites, bromates, chlorates, hypochlorites, permanganates, and any combination thereof. Examples of acid breakers may include, but are not limited to, hydrochloric acid, hydrofluoric acid, hydrobromic acid, hydroiodic acid, sulfuric acid, nitric acid, boric acid, chromic acid, and any combination thereof. Examples of delayed release acid breakers may include, but are not limited to, acetic anhydride and organic and inorganic acids such as fumaric acid, benzoic acid, sulfonic acid, phosphoric acids, aliphatic polyesters, poly lactic acid, poly(lactides), polyanhydrides, poly (amino acids), and any combination thereof.

Examples of suitable delayed release enzyme breakers may include, but are not limited to, alpha and beta amylases, exo- and endo-glucosidases, amyloglucosidase, oligoglucosidase, invertase, maltase, cellulase, hemicellulase, endoglucosidase, endo-xylanase, exo-xylanase, and any combination thereof. In some embodiments, the enzyme breakers are enzymes or combinations of enzymes that attack the glucosidic linkages of a cellulose gelling agent backbone and degrade the gelling agent into mostly monosaccharide and disaccharide units. Temperature activated breakers may activate by being heated by the subterranean zone in which they are placed, or by another external heat source. Examples of suitable temperature activated breakers may include, but are not limited to, alkaline earth metal peroxides, such as calcium peroxide and magnesium peroxide, zinc peroxide, and any combination thereof. Examples of suitable hydrolysable esters may include, but are not limited to, sorbitol, catechol, dimethyl glutarate and mixtures of dimethyl glutarate, dimethyl succinate, dimethyl adipate, and any combination thereof.

In certain embodiments, the breaker may be present in the spacer fluids in an amount in the range of from a lower limit of about 0.0001%, 0.001%, 0.01%, 0.05%, 0.1%, 0.15%, 0.2%, 0.25%, 0.3%, 0.35%, 0.4%, 0.45%, and 0.5% to an upper limit of about 1%, 0.95%, 0.9%, 0.85%, 0.8%, 0.75%, 0.7%, 0.65%, 0.6%, 0.55%, and 0.5% by weight of the gelling agent, encompassing any value and subset therebetween.

The spacer fluids of the present disclosure, as discussed previously may be substantially solids-free, or may additionally comprise a density-increasing particulate additive selected from the group consisting of degradable gel bodies, reticulated foam particulates, and any combination thereof.

The degradable gel bodies and/or reticulated foam particulates may aid in increasing the density of the spacer fluid relative to the treatment fluid is such that the two fluids remain substantially immiscible during intermittent placement in a fracture, or increase the denseness of the spacer fluid by providing a physical barrier through which the magnetic proppant particulates cannot migrate substantially into the spacer fluid, particularly because they may be agglomerated according to the methods described herein. The degradable gel bodies are additionally degradable such that they can be removed from the fracture to form the substantially magnetic proppant-free channels described herein. The reticulated foam particulates may be, but need not be, removed with the broken spacer fluid to form the substantially magnetic proppant-free channels described herein. The reticulated foam particulates may be removed from the fracture if, for example, they are made from a degradable material. The reticulated foam particulates are very highly porous and permeable, with more than about 95% of their structure is air and the remaining solid portion forming a framework for their body structure, and, thus, their presence in the substantially magnetic proppant-free channels does not substantially interfere with the conductivity of the channels. Unless otherwise specified, the term "reticulated foam particulates" refers to a very porous, low density solid foam, and encompasses both non-degradable and degradable reticulated foam particulates.

The degradable gel bodies and reticulated foam particulates may be any shape and size described above with reference to the proppant particulates used to form the magnetic proppant particulates of the present disclosure, or may be substantially larger, having a particle size distribution in the range of a lower limit of about 0.5 mm, 0.75 mm, 1 mm, 1.25 mm, 1.5 mm, 1.75 mm, 2 mm, 2.25 mm, 2.5 mm, 2.75 mm, 3 mm, 3.25 mm, 3.5 mm, 3.75 mm, 4 mm, 4.25 mm, 4.5 mm, 4.75 mm, and 5 mm to an upper limit of about 10 mm, 9.75 mm, 9.5 mm, 9.25 mm, 9 mm, 8.75 mm, 8.5 mm, 8.25 mm, 8 mm, 7.75 mm, 7.5 mm, 7.25 mm, 7 mm, 6.75 mm, 6.5 mm, 6.25 mm, 6 mm, 5.75 mm, 5.5 mm, 5.25 mm, and 5 mm encompassing any value and subset therebetween. The small size of the degradable gel bodies or the reticulated foam particulates may aid in their removal with the broken spacer fluid, which may be particularly beneficial when a non-degradable reticulated foam particulate is used in the embodiments described herein.

As mentioned previously, the degradable gel bodies or, if degradable, the degradable reticulated foam particulates can be degraded and removed with the broken spacer fluid. The degradable gel bodies or degradable reticulated foam particulates make up the bulk volume of the spacer fluid. The non-degradable reticulated foam particulates may remain in place in the proppant-free channels since their bodies are highly porous and permeable. Both the degradable gel bodies and degradable and non-degradable reticulated foam particulates are deformable when exposed to shear stress to allow their placement into the fractures.

In some embodiments, the degradable gel bodies may be made of a degradable polymeric material (e.g., a degradable superabsorbent polymer), a degradable salt of a polymeric material, and any combination thereof. Examples of suitable degradable gel bodies may include, but are not limited to, polyacrylamide, crosslinked poly(methacrylate), non-soluble acrylic polymers, salts thereof, and any combination thereof. In some embodiments, the degradable gel bodies may be substantially hollow and comprise a breaker therein that aids in breaking the spacer fluid upon degradation of the degradable gel bodies. Such breakers may be any of those listed above in connection with the methods of the present disclosure. Examples of suitable reticulated foam particulates may include, but are not limited to, a resin (e.g., any listed above with reference to the stabilization agent), a polyolefin, a polyurethane, a polyvinylchloride, and any combination thereof. The reticulated foam particulates may have a pore density in the range of from a lower limit of about 5 pores per linear inch (ppi), 10 ppi, 15 ppi, 20 ppi, 25 ppi, 30 ppi, 35 ppi, and 40 ppi to an upper limit of about 80 ppi, 75 ppi, 70 ppi, 65 ppi, 60 ppi, 55 ppi, and 50 ppi, encompassing any value and subset therebetween.

In those embodiments in which density-increasing particulate additive (e.g., the degradable gel body and/or the reticulated foam particulate) may be included in the spacer fluid in an amount in the range of a lower limit of about 50%, 52.5%, 55%, 57.5%, 60%, 62.5%, 65%, 67.5%, and 70% to an upper limit of about 90%, 87.5%, 85%, 82.5%, 80%, 77.5%, 75%, 72.5%, and 70% volume-by-volume of the spacer fluid, encompassing any value and subset therebetween.

In some embodiments, either the treatment fluid or the spacer fluid, unless already present therein, may further comprise one or more additives, provided that the function of the treatment fluid, the spacer fluid, the magnetic proppant particulates, and any other component of the present disclosure is not adversely affect. Suitable additives may be selected from the group consisting of a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a lost circulation material, a foaming agent, a gas, a pH control additive, a breaker, a biocide, a crosslinker, a stabilizer, a chelating agent, a scale inhibitor, a gas hydrate inhibitor, an oxidizer, a reducer, a friction reducer, a clay stabilizing agent, and any combination thereof.

In various embodiments, systems configured for delivering the treatment fluids comprising the magnetic proppant particulates and/or the spacer fluids (collectively referred to below simply as "fluids") described herein to a downhole location are described. In various embodiments, the systems may comprise a pump fluidly coupled to a tubular, the tubular containing the fluids described herein. It will be appreciated that while the system described below may be used for delivering fluids described herein, one or more portions of the fluid may be delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the fluids to a subterranean formation at or above a fracture gradient of the subterranean formation, but it may also be used in cases where fracturing is not desired. In some embodiments, the high pressure pump may be capable of fluidly conveying particulate matter, such as the magnetic proppant particulates or micro-proppant described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the fluids are formulated. In various embodiments, the pump (e.g., a low pressure pump, a high pressure pump, or a combination thereof) may convey the fluids from the mixing tank or other source of the fluids to the tubular. In other embodiments, however, the fluids may be formulated offsite and transported to a worksite, in which case the fluid may be introduced to the tubular via the pump directly from its shipping container (e.g., a truck, a railcar, a barge, or the like) or from a transport pipeline. In either case, the fluids may be drawn into the pump, elevated to an appropriate pressure, and then introduced into the tubular for delivery downhole.

FIG. 1 shows an illustrative schematic of a system that can deliver the fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the fluids of the embodiments herein may be formulated. The fluids may be conveyed via line 12 to wellhead 14, where the fluids enter tubular 16, tubular 16 extending from wellhead 14 into subterranean formation 18. Upon being ejected from tubular 16, the fluids may subsequently penetrate into subterranean formation 18. Pump 20 may be configured to raise the pressure of the fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the fluid may, in some embodiments, flow back to wellhead 14 and exit subterranean formation 18. In some embodiments, the fluid that has flowed back to wellhead 14 may subsequently be recovered and recirculated to subterranean formation 18.

It is also to be recognized that the disclosed fluids may also directly or indirectly affect the various downhole equipment and tools that may come into contact with the fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A

A method comprising: preparing a treatment fluid comprising a base fluid and magnetic proppant particulates, wherein the magnetic proppant particulates comprise proppant particulates at least partially coated with a stabilization agent and magnetic particles; preparing a spacer fluid comprising a base fluid, a gelling agent, and a breaker; introducing the treatment fluid and the spacer fluid intermittently into a subterranean formation comprising a fracture so as to alternate placement of the magnetic proppant particulates in the treatment fluid with the spacer fluid in the fracture; activating the magnetic particles, wherein the activated magnetic particles cause the magnetic proppant particulates to agglomerate; propping open the fracture with the magnetic proppant particulates; and activating the breaker in the spacer fluid so as to at least partially remove the spacer fluid from the fracture, thereby leaving behind substantially magnetic proppant particulate-free channels between the magnetic proppant particulates.

Embodiment A may have one or more of the following additional elements in any combination:

Element A1: Wherein the spacer fluid is substantially solids-free or further comprises a density-increasing particulate additive selected from the group consisting of degradable gel bodies, reticulated foam particulates, and any combination thereof.

Element A2: Wherein the magnetic particles are activated prior to introducing the treatment fluid and the spacer fluid intermittently into the subterranean formation.

Element A3: Wherein the magnetic particles are activated after introducing the treatment fluid and the spacer fluid intermittently into the subterranean formation.

Element A4: Wherein the magnetic proppant particulate coating is a configuration selected from the group consisting of a first layer of the stabilization agent followed by a second layer of the magnetic particles, dispersion of the magnetic particles within a network of the stabilization agent, or any combination thereof.

Element A5: Wherein the magnetic particles are selected from the group consisting of magnetite, iron, nickel, cobalt, manganese, ferrite, low carbon steel, an iron-steel alloy, an iron-cobalt alloy, an iron-silicon alloy, a nickel-iron alloy, and any combination thereof.

Element A6: Wherein the magnetic particles have an average particle size distribution of about 10 nm to about 100,000 nm.

Element A7: Wherein the magnetic particles are activated by a process selected from the group consisting of direct magnetization, indirect magnetization, and any combination thereof.

Element A8: Further comprising a wellhead with a tubular extending therefrom and into a subterranean formation; and a pump fluidly coupled to the tubular, the tubular comprising the treatment fluid, the spacer fluid, or alternatingly both.

By way of non-limiting example, exemplary combinations applicable to A include: A with A1 and A2; A with A1 and A3; A with A1 and A4; A with A1 and A5; A with A1 and A6; A with A1 and A7; A with A1 and A8; A with A2 and A4; A with A2 and A5; A with A2 and A6; A with A2 and A7; A with A2 and A8; A with A3 and A4; A with A3 and A5; A with A3 and A6; A with A3 and A7; A with A3 and A8; A with A4 and A5; A with A4 and A6; A with A4 and A7; A with A4 and A8; A with A5 and A6; A with A5 and A7; A with A5 and A8; A with A6 and A7; A with A6 and A8; A with A7 and A8; A with A1, A2, A4, A5, A6, A7, and A8; A with A1, A3, A4, A5, A6, A7, and A8; A with A3, A5, and A6; A with A3, A7, and A8; A with A4, A6, and A7; and the like.

Embodiment B

A method comprising: preparing a treatment fluid comprising a base fluid and magnetic proppant particulates, wherein the magnetic proppant particulates comprise proppant particulates at least partially coated with a stabilization agent and magnetic particles, and preparing a spacer fluid comprising a base fluid, a gelling agent, and a breaker; introducing the treatment fluid and the spacer fluid intermittently into a subterranean formation comprising a fracture so as to alternate placement of the magnetic proppant particulates in the treatment fluid with the spacer fluid in the fracture; activating the magnetic particles, wherein the activated magnetic particles cause the magnetic proppant particulates to agglomerate; propping open the fracture with the magnetic proppant particulates; curing the stabilization agent to consolidate the agglomerated magnetic proppant particulates; and activating the breaker in the spacer fluid so as to at least partially remove the spacer fluid from the fracture, thereby leaving behind substantially magnetic proppant particulate-free channels between the magnetic proppant particulates.

Embodiment B may have one or more of the following additional elements in any combination:

Element B1: Wherein the spacer fluid is substantially solids-free or further comprises a density-increasing particulate additive selected from the group consisting of degradable gel bodies, reticulated foam particulates, and any combination thereof.

Element B2: Wherein the magnetic particles are activated prior to introducing the treatment fluid and the spacer fluid intermittently into the subterranean formation.

Element B3: Wherein the magnetic particles are activated after introducing the treatment fluid and the spacer fluid intermittently into the subterranean formation.

Element B4: Wherein the magnetic proppant particulate coating is a configuration selected from the group consisting of a first layer of the stabilization agent followed by a second layer of the magnetic particles, dispersion of the magnetic particles within a network of the stabilization agent, or any combination thereof.

Element B5: Wherein the magnetic particles are selected from the group consisting of magnetite, iron, nickel, cobalt, manganese, ferrite, low carbon steel, an iron-steel alloy, an iron-cobalt alloy, an iron-silicon alloy, a nickel-iron alloy, and any combination thereof.

Element B6: Wherein the magnetic particles have an average particle size distribution of about 10 nm to about 100,000 nm.

Element B7: Wherein the magnetic particles are activated by a process selected from the group consisting of direct magnetization, indirect magnetization, and any combination thereof.

Element B8: Wherein the stabilization agent is cured at a time selected from the group consisting of before activating the breaker in the spacer fluid, after activating the breaker in the spacer fluid, or any combination thereof.

Element B9: Further comprising a wellhead with a tubular extending therefrom and into a subterranean formation; and a pump fluidly coupled to the tubular, the tubular comprising the treatment fluid, the spacer fluid, or alternatingly both.

By way of non-limiting example, exemplary combinations applicable to B include: B with B1 and B2; B with B1 and B3; B with B1 and B4; B with B1 and B5; B with B1 and B6; B with B1 and B7; B with B1 and B8; B with B1 and B9; B with B2 and B4; B with B2 and B5; B with B2 and B6; B with B2 and B7; B with B2 and B8; B with B2 and B9; B with B3 and B4; B with B3 and B5; B with B3 and B6; B with B3 and B7; B with B3 and B8; B with B3 and B9; B with B4 and B5; B with B4 and B6; B with B4 and B7; B with B4 and B8; B with B4 and B9; B with B5 and B6; B with B5 and B7; B with B5 and B8; B with B5 and B9; B with B6 and B7; B with B6 and B8; B with B7 and B8; B with B7 and B9; B with B1, B2, B4, B5, B6, B7, B8, and B9; B with B1, B3, B4, B5, B6, B7, B8, and B9; B with B4, B5, and B9; B with B3, B6, and B7; B with B4, B6, and B7; and the like.

Embodiment C

Magnetic proppant particulates comprising: proppant particulates at least partially coated with a stabilization agent and magnetic particles.

Embodiment C may have one or more of the following additional elements in any combination:

Element C1: Wherein the magnetic proppant particulate coating is a configuration selected from the group consisting of a first layer of the stabilization agent followed by a second layer of the magnetic particles, dispersion of the magnetic particles within a network of the stabilization agent, or any combination thereof.

Element C2: Wherein the magnetic particles are selected from the group consisting of magnetite, iron, nickel, cobalt, manganese, ferrite, low carbon steel, an iron-steel alloy, an iron-cobalt alloy, an iron-silicon alloy, a nickel-iron alloy, and any combination thereof.

Element C3: Wherein the magnetic particles have an average particle size distribution of about 10 nm to about 100,000 nm.

Element C4: Further comprising, wherein the magnetic particles are activated by a process selected from the group consisting of direct magnetization, indirect magnetization, and any combination thereof.

Element C5: Further comprising a wellhead with a tubular extending therefrom and into a subterranean formation; and a pump fluidly coupled to the tubular, the tubular comprising the magnetic proppant particulates.

By way of non-limiting example, exemplary combinations applicable to C include: C with C1 and C2; C with C1 and C3; C with C1 and C4; C with C1 and C5; C with C2 and C3; C with C2 and C4; C with C2 and C5; C with C3 and C4; C with C3 and C5; C with C4 and C5; C with C1, C2, C3, C4, and C5; C with C2, C3, and C5; C with C2, C4, and C5; C with C1, C2, and C4; C with C1, C4, and C5; and the like.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
preparing a treatment fluid comprising a base fluid and magnetic proppant particulates, the magnetic proppant particulates comprising proppant particulates at least partially coated with a stabilization agent and magnetic particles;
preparing a spacer fluid comprising a base fluid, a gelling agent, and a breaker, wherein the spacer fluid and the treatment fluid are substantially immiscible;
introducing the treatment fluid and the spacer fluid alternatingly into a subterranean formation comprising a fracture to alternate placement of the magnetic proppant particulates in the treatment fluid with the spacer fluid in the fracture, thereby forming separate columns of the treatment fluid comprising the magnetic proppant particulates between the spacer fluid;
activating the magnetic particles, thereby causing the magnetic proppant particulates to agglomerate;
propping open the fracture with the agglomerated magnetic proppant particulates;
activating the breaker in the spacer fluid to at least partially remove the spacer fluid from the fracture, thereby leaving behind substantially magnetic proppant particulate-free channels between the agglomerated magnetic proppant particulates; and
wherein the spacer fluid is substantially solids-free; and
wherein the solids-free spacer fluid prevents individual magnetic proppant particulates, agglomerated magnetic proppant particulates, or both, from gathering close to one another.

2. The method of claim 1, wherein the magnetic particles are activated prior to introducing the treatment fluid and the spacer fluid alternatingly into the subterranean formation.

3. The method of claim 1, wherein the magnetic particles are activated after introducing the treatment fluid and the spacer fluid alternatingly into the subterranean formation.

4. The method of claim 1, wherein the magnetic proppant particulate coating is a configuration selected from the group consisting of a first layer of the stabilization agent followed by a second layer of the magnetic particles, dispersion of the magnetic particles within a network of the stabilization agent, or any combination thereof.

5. The method of claim 1, wherein the magnetic particles are selected from the group consisting of magnetite, iron, nickel, cobalt, manganese, ferrite, low carbon steel, an iron-steel alloy, an iron-cobalt alloy, an iron-silicon alloy, a nickel-iron alloy, and any combination thereof.

6. The method of claim 1, wherein the magnetic particles have an average particle size distribution of about 10 nm to about 100,000 nm.

7. The method of claim 1, wherein the magnetic particles are activated by a process selected from the group consisting of direct magnetization, indirect magnetization, and any combination thereof.

8. The method of claim 1, further comprising a wellhead with a tubular extending therefrom and into the subterranean formation; and
a pump fluidly coupled to the tubular, the tubular comprising the treatment fluid, the spacer fluid, or alternatingly both.

9. A method comprising:
preparing a treatment fluid comprising a base fluid and magnetic proppant particulates, the magnetic proppant particulates comprising proppant particulates at least partially coated with a stabilization agent and magnetic particles, and
preparing a spacer fluid comprising a base fluid, a gelling agent, and a breaker, wherein the spacer fluid and the treatment fluid are substantially immiscible;
introducing the treatment fluid and the spacer fluid alternatingly into a subterranean formation comprising a fracture to alternate placement of the magnetic proppant particulates in the treatment fluid with the spacer fluid in the fracture, thereby forming separate columns of the treatment fluid comprising the magnetic proppant particulates between the spacer fluid;
activating the magnetic particles, the activated magnetic particles causing the magnetic proppant particulates to agglomerate;
propping open the fracture with the magnetic proppant particulates;
curing the stabilization agent to consolidate the agglomerated magnetic proppant particulates;
activating the breaker in the spacer fluid to at least partially remove the spacer fluid from the fracture, thereby leaving behind substantially magnetic proppant particulate-free channels between the agglomerated magnetic proppant particulates; and
wherein the spacer fluid is substantially solids-free; and
wherein the solids-free spacer fluid prevents individual magnetic proppant particulates, agglomerated magnetic proppant particulates, or both, from gathering close to one another.

10. The method of claim 9, wherein the magnetic particles are activated prior to introducing the treatment fluid and the spacer fluid alternatingly into the subterranean formation.

11. The method of claim 9, wherein the magnetic particles are activated after introducing the treatment fluid and the spacer fluid alternatingly into the subterranean formation.

12. The method of claim 9, wherein the magnetic proppant particulate coating is a configuration selected from the group consisting of a first layer of the stabilization agent followed by a second layer of the magnetic particles, dispersion of the magnetic particles within a network of the stabilization agent, or any combination thereof.

13. The method of claim 9, wherein the magnetic particles are selected from the group consisting of magnetite, iron, nickel, cobalt, manganese, ferrite, low carbon steel, an iron-steel alloy, an iron-cobalt alloy, an iron-silicon alloy, a nickel-iron alloy, and any combination thereof.

14. The method of claim 9, wherein the stabilization agent is cured at a time selected from the group consisting of before activating the breaker in the spacer fluid, after activating the breaker in the spacer fluid, or any combination thereof.

15. The method of claim 9, further comprising a wellhead with a tubular extending therefrom and into the subterranean formation; and
- a pump fluidly coupled to the tubular, the tubular comprising the treatment fluid, the spacer fluid, or alternatingly both.

* * * * *